(No Model.)

W. J. PITKIN.
DISPLAY HOOK.

No. 551,736. Patented Dec. 17, 1895.

Witnesses
F. Kieser
R. M. Smith

Inventor
Walter J. Pitkin.

By his Attorneys.
C. A. Snow & Co.

UNITED STATES PATENT OFFICE.

WALTER J. PITKIN, OF CORINTH, NEW YORK.

DISPLAY-HOOK.

SPECIFICATION forming part of Letters Patent No. 551,736, dated December 17, 1895.

Application filed August 20, 1895. Serial No. 559,924. (No model.)

*To all whom it may concern:*

Be it known that I, WALTER J. PITKIN, a citizen of the United States, residing at Corinth, in the county of Saratoga and State of New York, have invented a new and useful Display-Hook, of which the following is a specification.

This invention relates to an improvement in display-hooks, and has for its object to provide a simple, inexpensive and convenient article of the nature referred to, wherein provision is made for clasping a card having printed thereon the price of the article or the name or any descriptive matter in relation to the article to which the hook is applied.

To the above end the invention consists in a display hook or hanger comprising a hook member, a pivoted member hinged thereto and operating as a movable jaw for adapting the hook as a whole to engage and support any desired article, a pin or pivot connecting said members, and an actuating-spring disposed around said pin or pivot and bearing at one end against the pivoted jaw member and having its opposite end extended upwardly and then reversely bent to form an open loop which bears snugly against the hook member and between which and the hook member a price or display card may be introduced and clasped.

Figure 1:
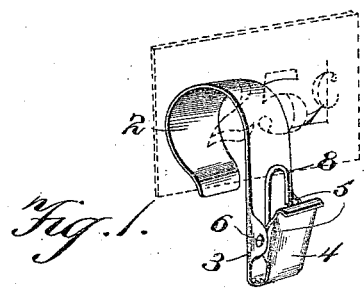
Figure 2:
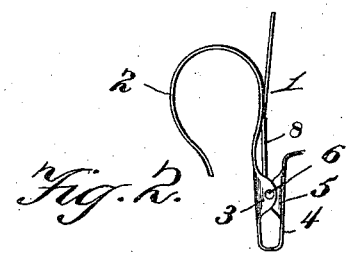
Figure 3:
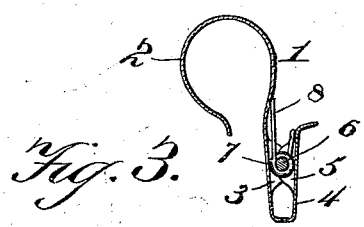

In the accompanying drawings, Figure 1 is a perspective view of an improved display-hook constructed in accordance with this invention. Fig. 2 is a side elevation of the same with a price-card shown applied thereto. Fig. 3 is a vertical section through the same.

Similar numerals of reference designate corresponding parts in the several figures of the drawings.

Referring to the drawings, 1 designates the hook member of the improved device which is formed with a hook 2, adapted to be passed over and engaged with a rod, cord or other overhead support. The main body of the hook member is extended downwardly any desired distance, and formed at its lower end with a row of teeth, which extend laterally therefrom upon the opposite side to that upon which the hook is formed. Between the hook and the teeth is a pair of perforated ears 3, disposed upon the same side of the hook member as the teeth referred to. 4 designates the other member of the device, which is materially shorter than the hook member and is also provided with a pair of perforated ears 5, corresponding to the ears 3 of the hook member. The two members are united by means of a horizontal pin or pivot 6, which passes through the ears 3 and 5 thereof, thus hinging the members together and adapting the member 4 to be rocked relatively to the hook member. The member 4 is provided at its lower end with teeth, which project toward and are arranged to intermesh with the teeth on the hook member, the upper end thereof being bent outwardly to facilitate the rocking of the same by the finger.

7 designates a piece of spring-wire, which is given one or more coils around the pin or pivot 6, and has one extremity arranged within and bearing outwardly against the upper end of the member 4 in such manner as to force the lower end of such member against the corresponding end of the hook member for the purpose of clasping an article in a manner well understood. The other terminal of this spring is extended upwardly some distance above the plane of the upper end of the member 4, where it is given a semicircular bend and extended downwardly and terminated to form an open loop 8, of substantially inverted-U shape, which is adapted to press snugly against the hook member and to receive and firmly hold a price-card between the same and the hook member in the manner shown in Fig. 2.

In operation, the article to be displayed is clamped between the toothed lower ends of the two members, after which the price-card is inserted between the spring-loop 8 and the hook member, when the device is ready to be engaged with an overhead support. By extending one of the terminals of the usual spring upwardly, and forming the clamping-loop described, a very simple and inexpensive device is produced, as compared with similar devices in which the card-holder is formed separately. In addition to this it will be seen that by the particular arrangement of the card-holding device the member 4 may be manipulated for engaging or releasing an article without interfering with or rendering it necessary to remove the card.

Having thus described the invention, what is claimed as new, and desired to be secured by Letters Patent, is—

A display hanger comprising a hook member, a pivoted jaw member hinged thereto, and a spring disposed between said members in such manner as to force their extremities together, one of the terminals of said spring being extended to form a clasp which lies between the hook member and the pivoted jaw, substantially as and for the purpose specified.

In testimony that I claim the foregoing as my own I have hereto affixed my signature in the presence of two witnesses.

WALTER J. PITKIN.

Witnesses:
HERBERT H. SMITH,
ELMER G. BOGLE.